(12) United States Patent
Keyetieu et al.

(10) Patent No.: US 11,782,141 B2
(45) Date of Patent: Oct. 10, 2023

(54) METHOD AND APPARATUS FOR AUTOMATIC CALIBRATION OF MOBILE LIDAR SYSTEMS

(71) Applicants: CENTRE INTERDISCIPLINAIRE DE DEVELOPPEMENT EN CARTOGRAPHIE DES OCEANS (CIDCO), Rimouski (CA); Microdrones Canada, Inc., Vaud-Dorion (CA)

(72) Inventors: Rabine Keyetieu, Brest (FR); Nicolas Seube, Rimouski (CA); Stefanie Van-Wierts, Rigaud (CA)

(73) Assignees: Centre Interdisciplinaire de Developpement en Cartographie des Oceans (CIDCO); Microdrones Canada, Inc.

( * ) Notice: Subject to any disclaimer, the term of this patent is extended or adjusted under 35 U.S.C. 154(b) by 1209 days.

(21) Appl. No.: 16/267,470

(22) Filed: Feb. 5, 2019

(65) Prior Publication Data
US 2020/0041623 A1 Feb. 6, 2020

Related U.S. Application Data

(60) Provisional application No. 62/626,465, filed on Feb. 5, 2018.

(51) Int. Cl.
*G01S 7/497* (2006.01)
*G01S 17/89* (2020.01)
(Continued)

(52) U.S. Cl.
CPC ............ *G01S 7/497* (2013.01); *B64C 39/024* (2013.01); *G01S 17/89* (2013.01); *B64U 2101/30* (2023.01)

(58) Field of Classification Search
CPC . B64C 2201/123; B64C 39/024; G01C 21/16; G01C 21/165; G01C 25/00;
(Continued)

(56) References Cited

U.S. PATENT DOCUMENTS 7,969,558 B2 6/2011 Hall
8,543,265 B2 9/2013 Ekhaguere et al.
(Continued)

OTHER PUBLICATIONS

Glira et al. "Rigorous Strip Adjustment of UAV-based Laser scanning Data Including Time-Dependent Correction of Trajectory Errors" Photogrammetric Engineering & Remote Sensing vol. 82, No. 12, Dec. 2016, pp. 945-954.*
(Continued)

*Primary Examiner* — Mohammed S Rahaman
(74) *Attorney, Agent, or Firm* — Fishman Stewart PLLC

(57) ABSTRACT

A method and apparatus for the automatic calibration method described in this application provides an integrated framework for performing a reliable and objective estimation of IMU-LiDAR latency and boresight angles. This method, based on the estimation of calibration parameters through the resolution of observation equations is able to deliver boresight and latency estimates as well as their precision. A new calibration method for the boresight method angles between a LiDAR and an IMU, based on an automatic data selection algorithm, followed by the adjustment of bore sight angles. This method, called LIBAC (LiDAR-IMU Boresight Automatic Calibration), takes in input overlapping survey strips following a sample line pattern over a regular slope. First, construct a boresight error observability criterion, used to select automatically the most sensitive soundings to boresight errors. From these soundings, adjust the boresight angle 3D, thus taking into account the coupling between angles. From a statistical analysis of the adjustment results, we derive the boresight precision.

4 Claims, 7 Drawing Sheets

(51) Int. Cl.
B64C 39/02 (2023.01)
B64U 101/30 (2023.01)

(58) Field of Classification Search
CPC .......... G01S 17/86; G01S 17/89; G01S 7/497; G01S 7/4972
See application file for complete search history.

(56) References Cited

U.S. PATENT DOCUMENTS

| | | | |
|---|---|---|---|
| 9,285,477 B1 | 3/2016 | Smith et al. | |
| 2015/0370251 A1 | 12/2015 | Siegel et al. | |
| 2016/0291134 A1 | 10/2016 | Droz et al. | |
| 2018/0307238 A1* | 10/2018 | Wisniowski | G05D 1/0246 |

OTHER PUBLICATIONS

"Towards Automated LiDAR Boresight Self-calibration" Author: Skaloud, Jan; Schaer, Philipp Published inMMS 2007, Padova; 5th International Symposium on Mobile Mapping Technology, Padova (Italy), May 29-31, 2007.*
• Seube et. al. "A simple method to recover the latency time of tactical grade IMU systems" 2012 International Society for Photogrammetry and Remote Sensing, Inc. (ISPRS) Published by Elsevier.*
• Automatic In-Flight Boresight Calibration Considering Topography for Hyperspectral Pushbroom Sensors, IGARSS 2014.*
• Development of a Portable Mobile Laser Scanning System with Special Focus on the System Calibration and Evaluation; MCG 2016—5th International Conference on Machine Control & Guidance "Facing complex outdoor challenges by inter-disciplinary research" Vichy, France, Oct. 5-6, 2016.*
• K. D. Singh and C. Nansen, "Advanced calibration to improve robustness of drone-acquired hyperspectral remote sensing data," 2017 6th International Conference on Agro-Geoinformatics, 2017, pp. 1-6, doi: 10.1109/Agro-Geoinformatics.2017.8047061.*
• Liu W. LiDAR-IMU Time Delay Calibration Based on Iterative Closest Point and Iterated Sigma Point Kalman Filter. Sensors (Basel). Mar. 8, 2017;17(3):539. doi: 10.3390/s17030539. Erratum in: Sensors (Basel). Dec. 5, 2017;17 (12 ): PMID: 28282897; PMCID: PMC5375825.*
• "A Direct Georeferencing System for Real-Time Position and Attitude Determi-Nation of Lightweight UAVS;" Christian Eling, Lasse Klingbeil and Heiner Kuhlmann; May 17-21, 2015.*
• In-Situ Camera and Boresight Calibration With LIDAR Data, 2007 Precise Positioning of UAVS—Dealing With Challenging RTK-GPS Measurement Conditions During Automated UAV Flights.*
• "A Light-Weight Laser Scanner for UAV Applications" The International Archives of the Photogrammetry, Remote Sensing and Spatial Information Sciences, vol. XLI-B1, 2016 XXIII ISPRS Congress, Jul. 12-19, 2016, Prague, Czech Republic.*
• Simultaneous Calibration of ALS Systems and Alignment of Multiview LiDAR Scans of Urban Areas; IEEE Transactions on Geoscience and Remote Sensing, vol. 50, No. 6, Jun. 2012.*
Microdrones GmbH—Operator's Handbook—Rev. Apr. 21, 2016.

* cited by examiner

METHOD AND APPARATUS FOR AUTOMATIC CALIBRATION OF MOBILE LIDAR SYSTEMS

TECHNICAL FIELD

The present invention relates to a method and apparatus for automatic calibration of LiDAR systems. More particularly, the present invention relates to boresight and latency automatic calibration of LiDAR systems on natural surfaces. More particularly still, the present invention relates to boresight and latency automatic calibration of LiDAR systems integrated in mobile platforms.

BACKGROUND OF THE INVENTION

Mobile light detection and ranging (LiDAR) systems are widely used in mobile mapping at various scales. Airborne surveys enable to map wide areas at high speed and relatively low resolution, while Unmanned Aerial Vehicles (UAV) are used to get a detailed description of a local areas. Airborne and UAV LiDAR systems are composed of a Global Navigation Satellite System (GNSS) positioning system, an Inertial Measurement Unit (IMU) and a LiDAR, which determines relative ranges to the terrain. Geo-referencing of points is performed by merging LiDAR ranges, IMU attitude angles and positions through a point positioning mathematical model. This model depends on several geometrical and system integration parameters which are sources of systematic errors which can be observed in comparing overlapping survey strips.

LiDAR systems geometrical parameters that require accurate calibration include LiDAR-LMU boresight angles and lever-arms between the Positioning Reference Point (PRP) and the Optical Center (OC) of the LiDAR. The geometric calibration of LiDAR systems is required to eliminate systematic errors due to misalignment between the LiDAR and IMU measurement frames.

LiDAR-IMU latency should also be considered as a source of error in LiDAR system surveys, since the time-tagging implementation may introduce inconsistency between the LiDAR time base and the IMU time base. A method for the recovery of IMU-LiDAR was proposed in [Seube et al., 2012]. Latency estimation should be performed before boresight and lever-arms calibration to avoid the presence of systematic dynamic errors due to the survey platform motion.

In [Morin et al., 2002], tie points are used to adjust the boresight angles of a LiDAR systems, which limits the method accuracy due to the need of interpolating raw data. Surface matching techniques have also been used in [Burman (2000)], the main drawback of these methods being to model the effect of boresight as a rotation in the LiDAR object domain, which is true for points, but not for surfaces. A classification between rigorous, semi-rigorous and non-rigorous method was proposed in [Skaloud and Litchi, 2006]. Rigorous methods estimate the boresight angles by adjusting a parametric model which is consistent with the actual effect of boresight on a geometrical object. If boresight angles are represented by a coordinate transformation matrix, then the estimation should be done from data distorted by the same class of coordinate transformations. In fact, rigorous methods adjust parametric model using point or swath data, as these two objects are submitted to coordinate transformation. Adjusting normal vectors to planes lies in the semi-rigorous class of method if the plane elements are sufficiently small. Indeed, the effect of boresight error on a planar surface is not strictly speaking a coordinate transformation.

Intensive research has been performed in boresight calibration of LiDAR systems, leading in the recent years to almost automated procedures [Filin, 2003], [Friess 2006], [Skaloud 2007], [Hlebel et al. (2012)] for data selection and rigorous boresight adjustment methods. In [Skaloud 2007] a rigorous boresight estimation method based on the adjustment of points on planar surface elements has been proposed. This method can be used whenever the underlying terrain exhibits planar. In [Hebel et al. (2012)] a RANSAC based shape extraction method is proposed to match homologous surfaces.

Most of the approaches proposed for boresight calibration use a model of the systematic errors effect through a point geo-referencing model [Filin et al., 2004], [Skaloud and Litchi, 2006], [Kumari et al., 2011], [Barber et al., 2008]. By observing inconsistencies in point clouds from overlapping survey strips, an error criterion can be defined and optimized to adjust overlapping points on a given parametric surface. Boresight angles and surface parameters are then determined simultaneously by applying a Least Square method.

One of the major outcomes of automatic calibration methods is the statistical analysis of boresight residuals, providing precision estimates of boresight angles. This information can then be used for quality control purposes and to refine total propagated error models, based on the propagation of each LiDAR system component uncertainty, including boresight.

A search of issued U.S. patents in the field of boresight calibration of LiDAR systems reveals U.S. patents related generally to the field of the present invention but which do not anticipate nor disclose the apparatus or method of the present invention. The discovered U.S. patents relating generally to the present invention are discussed herein below.

U.S. Patent Application No. 2016/0291134 A1 to Droz et al. entitled "Long Range Steerable LiDAR System" discloses systems and methods that relate to a light detection and ranging (LiDAR) device. The LiDAR device includes a fiber laser configured to emit light within a wavelength range, a scanning portion configured to direct the emitted light in a reciprocating manner about a first axis, and a plurality of detectors configured to sense light within the wavelength range. The device additionally includes a controller configured to receive target information, which may be indicative of an object, a position, a location, or an angle range. In response to receiving the target information, the controller my cause the rotational mount to rotate so as to adjust a pointing direction of the LiDAR. The controller is further configured to cause the LiDAR to scan a field-of-view (FOV) of the environment. The controller may determine a three-dimensional (3D) representation of the environment based on data from scanning the FOV.

U.S. Pat. No. 9,285,477 B1 to Smith et al. entitled "3D Depth Point Cloud from Timing Flight of 2D Scanned Light Beam Pulses" discloses a light detection and ranging (LiDAR) system having an emitter which produces a sequence of outgoing pulses of coherent collimated light that is transmitted in a given direction. A mirror system having a scanning mirror that is positioned to deflect the outgoing pulse sequence towards a scene, and a detector collocated with the emitter and aimed to detect a sequence of incoming pulses being reflections of the outgoing pulses that are returning from said given direction and have been deflected by the scanning mirror. An electronic controller communicates with the emitter and the detector and controls the scanning mirror, so that the outgoing pulses scan the scene and the controller computes a radial distance or depth for each pair of outgoing and incoming pulses and uses the computed radial distance to provide a scanned 3D depth map of objects in the scene.

U.S. Pat. No. 8,543,265 B2 to Ekhaguere et al. entitled "Systems and Methods for Unmanned Aerial Vehicle Navigation" discloses systems and methods for unmanned aerial vehicle (UAV) navigation. In a preferred embodiment, a UAV is configured with at least one flight corridor and flight path, and a first UAV flight plan is calculated. During operation of the first UAV flight plan, the UAV visually detects an obstacle, and calculates a second UAV flight plan to avoid the obstacle. Furthermore, during operation of either the first or second UAV flight plan, the UAV acoustically detects an unknown aircraft, and calculates a third UAV flight plan to avoid the unknown aircraft. Additionally, the UAV may calculate a new flight plan based on other input, such as information received from a ground control station.

U.S. Pat. No. 7,969,558 to Hall entitled "High Definition LiDAR System" discloses a LiDAR based 3D point cloud measuring system and method. An example system includes a base, a housing, a plurality of photon transmitters and photon detectors contained within the housing, a rotary motor that rotates the housing about the base, and a communication component that allows transmission of signals generated by the photon detectors to external components. The rotary component includes a rotary power coupling configured to provide power from an external source to the rotary motor, the photon transmitters, and the photon detectors. In another embodiment, the photon transmitters and detectors of each pair are held in a fixed relationship with each other. In yet another embodiment, a single detector is "shared" among several lasers by focusing several direction regions onto a single detector, or by using a single large detector.

None of the above listed publications disclose or suggest boresight automatic calibration of LiDAR systems on natural systems as described in the present invention. Each of the above listed published documents: [Seube et al., 2012], [Morin et al., 2002], [Burman (2000)], [Skaloud and Litchi, 2006], [Filin, 2003], [Friess 2006], [Skaloud 2007], [Hebel et al. (2012)], as well as U.S. patents and applications No. US 2016/0291134 A1, U.S. Pat. No. 9,285,477 B1, U.S. Pat. No. 8,543,265 B2, and U.S. Pat. No. 7,969,558 are hereby incorporated herein by reference.

SUMMARY OF THE INVENTION

Problems and limitations of the forgoing described approaches are overcome and other advantages are provided by a new and improved apparatus and method for boresight and latency automatic calibration of LiDAR systems on natural or man-made surfaces. The approach proposed in this application follows the same lines but discloses improvements in terms of data selection and boresight and latency estimation.

A new calibration method for the boresight method angles between a LiDAR and an IMU, based on an automatic data selection algorithm, followed by the adjustment of boresight angles. This method, called LIBAC (LiDAR-IMU Boresight Automatic Calibration), takes in input overlapping survey strips following a sample line pattern over a regular slope. First, construct a boresight error observability criterion, used to select automatically the most sensitive points to boresight errors. From these points, adjust the three boresight angles, thus taking into account the coupling between angles. From a statistical analysis of the adjustment results, we derive the boresight precision. Numerical results obtained with a LiDAR system integrated within a UAV (unmanned aerial vehicle) are described.

Therefore, it is an object of the present invention to provide novel improvements in terms of data selection and boresight estimation in the calibration of LiDAR systems on natural surfaces or on man-made structures. A further object is to effect rigorous latency and boresight calibration methods, automatic data selection, non-linear optimization performance analysis which includes repeatability analysis and the ability to integrate applicant software within the mission planning process.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE PREFERRED EMBODIMENTS

The present specification is organized as follows: First discussed is a general framework for system and mounting parameters of LiDAR systems. Then presented is the mathematical formulation of point geo-referencing from LiDAR systems data together with the problem setting of boresight calibration on natural surfaces in the second section. It will be shown that one of the key point of boresight calibration on natural surfaces lies on appropriate data selection methods.

LiDAR System Parameter Calibration

A typical LiDAR survey system consists of a positioning system giving the position of a Reference Point (RP), an IMU giving its orientation with respect to a Local Astronomic Frame (LAF) and the LiDAR itself delivering acoustic ranges along a swath oriented perpendicularly to the survey vessel trajectory. Let us mention that in practice, the IMU gives orientation in a Local Geodetic Frame (LGF), as most tactical grade IMU used in airborne of UAV surveying are unable to distinguish the (LAF) from the (LGF). Therefore, we shall denote the (LGF) frame by (n) (navigation frame) to avoid confusion between the geodetic and astronomical frames.

The following frames will be used in the framework of this paper:

The Local Geodetic Frame (LGF), that will be denoted by (n) and called the navigation frame;

The IMU body frame, denoted by (bI);

The LiDAR body frame, denoted by (bS).

Figure 3:
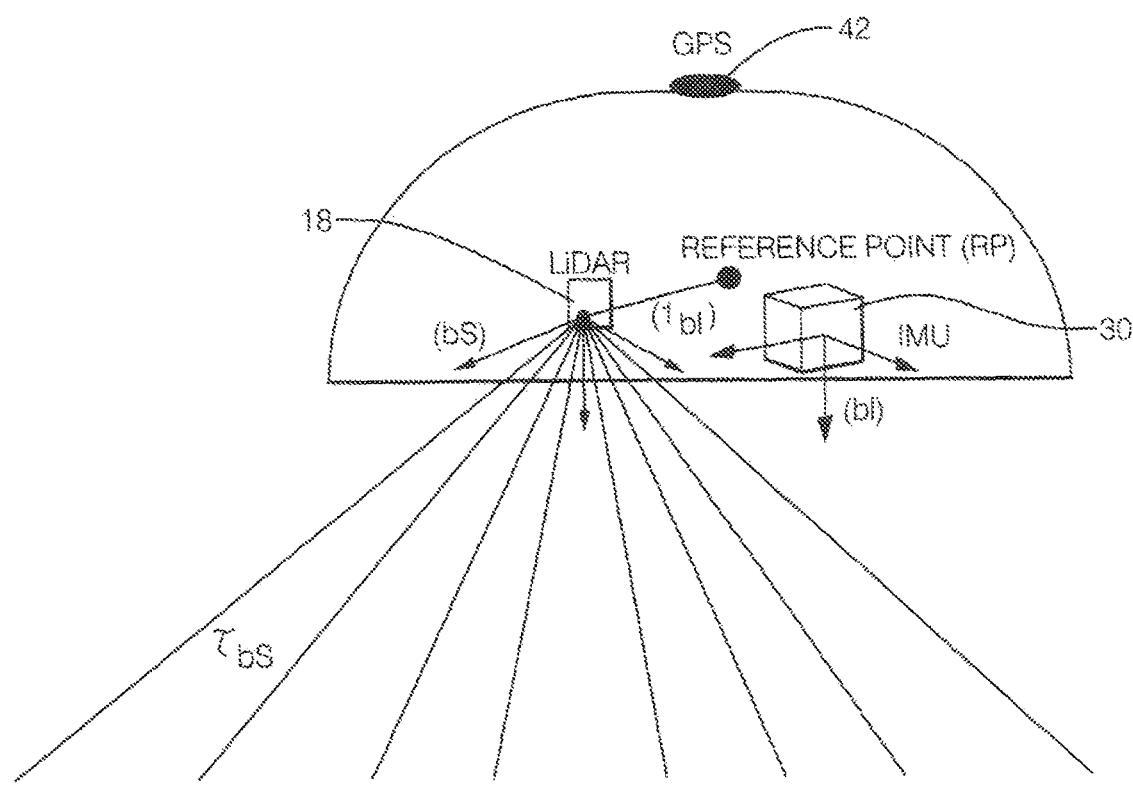
FIG. 3, is a schematic of a LiDAR pod system of FIG. 2 including a LiDAR network, an INS (or IMU) and a GPS receiver.

The main objective of this invention is to design a calibration method for estimating the frame transformation from the (bS) frame to the (bI) frame, denoted by $[C]\_(bS)\hat{}bI$ which depends on three boresight angles, denoted by &p the boresight roll angle, $\delta\theta$, the boresight pitch angle and $\delta\psi$, the boresight yaw angle. Refer Paragraph [00199]. We shall denote hereafter by on $[C]\_(F1)\hat{}F2$ the direction cosine matrix corresponding to the transformation from frame F1 to F2. Refer Paragraph [00200]. The LiDAR system geometrical parameters that need to be known by the user are the boresight angles (or mounting angles), the lever arms between the position Reference Point (RP) and the Optical Center of the LiDAR, as illustrated in FIG. 3, which constitutes a typical LiDAR system composed of a LiDAR, an INS (or IMU), a GPS receiver. The LiDAR frame is (bS), the IMU frame is (bI). The lever arm between the LiDAR and positioning Reference Point (RP) is $a_{bI}$. The LiDAR ranging returns, coordinated in the (bS) frame, are denoted by $r_{bS}$.

Lever arms and boresight angles could be jointly estimated using the same adjustment method. However, data sets to be used for boresight calibration and for lever arms calibration should be distinct, since the effect of these two systematic errors cannot generally be observed simultaneously. Therefore, the methodology we propose is based on two distinct boresight and lever arm calibration processes, based on data selection procedures dedicated to each parameter. However, this paper will only focus on the estimation of boresight angles.

LiDAR System Geo-Referencing Model

Geo-referencing is a combination of raw data from GNSS, IMU and LiDAR to provide points, coordinated in the navigation frame. Geo-referencing of a given LiDAR return can be done as follows:

From the beam angles, compute the launch vector expressed in the LiDAR (bS) frame;

From IMU attitude data, coordinate the launch vector in the (n) frame;

Using the beam travel time construct the path from the OC of the LiDAR to the terrain;

Finally, using the LiDAR system PRP position, coordinate the point in the LGF.

Denoting by $X_n(t)=(x, y, z)^\tau{}_n$ a geo-referenced point in the (n) frame at time t, we have:

$$X_n(t)=P_n(t)+C\_(bI)\hat{}n(t-dt)(C\_(bS)\hat{}BIr\_bS(t)+a\_bI)$$
Refer Paragraph [00201]. (1)

where, $P_n(t)$ is the position delivered by the GNSS receiver in frame (n), $C\_(bI)\hat{}n$ is the coordinate transformation from the IMU body frame to the navigation frame (which can be parameterized using Euler angles ($\varphi$, $\theta$, $\psi$), denoting pitch, roll and yaw, respectively), the LiDAR return $r_{bS}$, coordinated in the LiDAR frame (bS), the lever-arm vector coordinated in the IMU frame $a_{bI}$ and the boresight coordinate transformation $[C]\_(bS)\hat{}bI$. Refer Paragraphs [00201 and 00199].

In equation (1), t denotes the reference time from the GPS, which is supposed to be propagated to the IMU through a distributed time and message synchronization system. Thus, the OPS system and the IMU are supposed to share the same time base.

The dependency of the calibration parameters on LIDAR points geo-referencing is described by equation (1), among them are:

dt, then latency between the IMU and the LiDAR (it is to be noticed that in most LiDAR systems, latency between GNSS and the LiDAR impact can be considered as negligible, but latency between the LiDAR and IMU is not [Seube et al., 2012];

$[C]\_(bS)\hat{}bI$, the boresight coordinate transformation. [Refer Paragraph 00199];

$a_{BI}$, the lever-arms;

The LiDAR range and beam angle, affecting the term $r_{bS}$.

Described here is an estimation procedure of the boresight coordinate transformation $[C]\_(bS)\hat{}bI$ and the latency between the IMU and the LiDAR. [Refer Paragraph 00199].

General Principle of the Boresight and Latency UAV Calibration

The calibration method is devoted to aerial UAVs and is in part automated, without supervision of the user. The LiDAR system is integrated on the UAV, including mission planning. The integrated hardware system is composed of a LiDAR sensor, a GNSS-INS unit, an embedded computer and a camera.

"Boresight angles" being defined as misalignment between the INS frame and the LiDAR frame, and "Latency" being defined as time delay between the time-tag of INS and LiDAR data, the procedure for calibrating the boresight and latency parameters is as follows:

1. The UAV takes-off and the users flies it to a location where the terrain or man-made structures has a minimum slope of 10%;
2. Whenever the calibration procedure is launched by the user from the control panel, the UAV is making a 360° turn at a fixed point while scanning the terrain with the LiDAR system;

3. From this data set, the terrain steepest slope is determined;
4. The UAV computes a LIBAC line pattern in starting by a calibration line along the steepest slope. It flies the opposite line to make the calibration line 2;
5. The UAV computes the outer beam location of the right side of the first calibration line, and the calibration line 3 is done in making the Nadir to match the outer beams locations;
6. The UAV is flying the opposite line 4;
7. The UAV transmits the data acquired during the 4 lines to the ground;
8. The UAV is flying again line 3 with the highest possible roll oscillations;
9. The UAV transmits line 3 with roll oscillation to the ground;

The calibration is done using post-processed GNSS reference point positions and therefore in post-processing. Whenever the post-processing is performed:

10. The IMU-LIDAR latency calibration is achieved by applying LILAC;
11. The data set acquired for the boresight calibration is corrected from the estimated IMU-LIDAR latency;
12. Boresight calibration is performed using LIBAC using the dataset corrected for latency.

Once the calibration is done, the ground computer georeferenced the LiDAR dataset corresponding to the 5 survey lines; and computes the uncertainty along surface elements normal on a grid which step size is defined by the user. The result is the uncertainty map of the calibrated LiDAR system.

The calibration is based on two methods: LILAC for latency calibration and LIBAC for boresight estimation.

The calibration procedure consists in:
1. Acquiring data along a survey line with roll motion over a relatively flat surface. This line is fed to LILAC, which output a latency estimate. This latency estimate is then set in a geo-referencing software to correct the point cloud for IMU-LiDAR latency.
2. Acquiring data along 4 survey lines, following the line pattern described in FIGS. 5A and 5B. Then, boresight calibration can occur, in performing a line pattern consisting in two quasi parallel lines over a slope. The outcomes of LIBAC are three boresight angles between the IMU frame and the LiDAR frame and the associated standard deviations.

LILAC (LiDAR IMU Latency Automatic Calibration)

LILAC is a calibration method devoted to IMU-LiDAR latency determination from natural terrain data. The estimation is performed by adjusting a set of points on a quadratic surface, meanwhile determining the latency and the surface parameters. Selected data used for the calibration are done using a dynamic criterion (high angular velocities and low angular acceleration).

Figure 6:
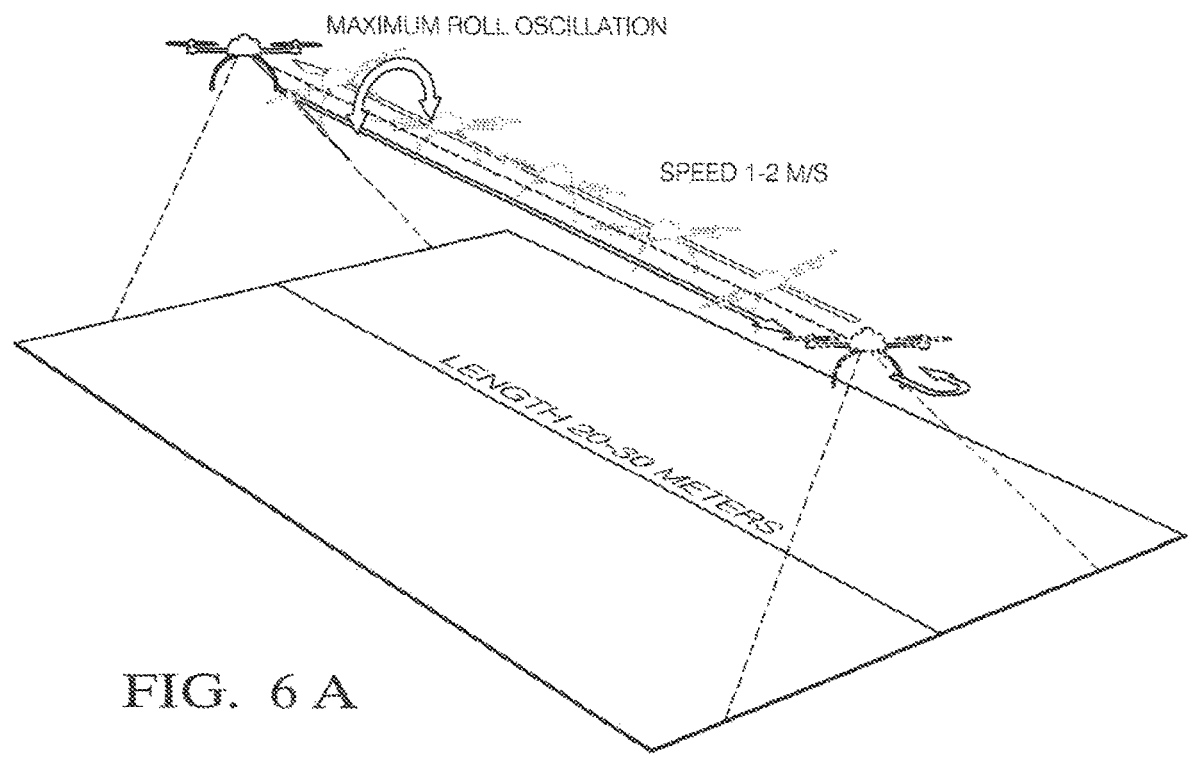
FIGS. 6A, 6B and 6C, represent the line pattern of a fully automated LiDAR-IMU Latency Automatic Calibration (LILAC) system, formed by one survey line over relatively flat and smooth terrain, wherein the UAV should perform this line with maximum allowable roll oscillations, generating high roll velocities.
Figure 6:
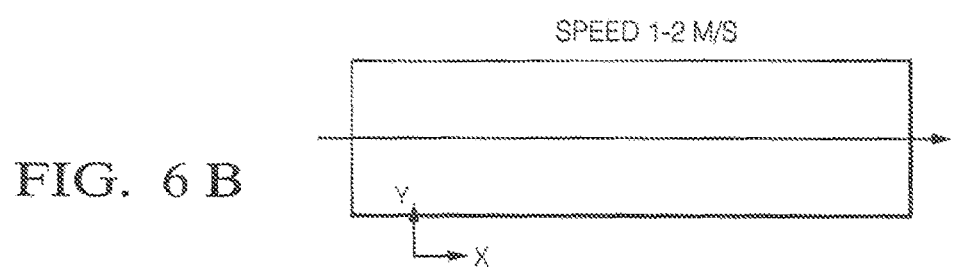
Figure 6:
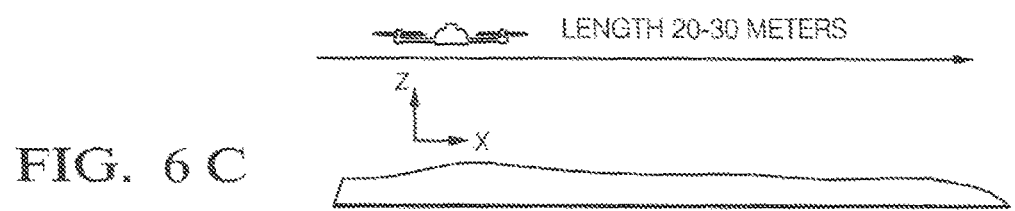

Referring to FIGS. 6A-6C. LILAC needs only one line on a relatively flat and smooth terrain. Since latency is strongly related to angular velocities, it is advised to have the highest variation of attitude while running the calibration lines.

Line Pattern for LILAC

LILAC requires one calibration line without any overlap on a smooth terrain, but with relatively high roll dynamics, as shown in FIGS. 6A-6C. The line length range is 20-30 meters at a velocity of 1-2 m/s.

To adjust the IMU to LiDAR latency, we derive a parametric model depending explicitly on dt. Considering a first order approximation of the frame transformation matrix $C\_(bI)\hat{}n(t)$, equation (1) [Refer Paragraph 00202] can be re-written by:

$$X\_n(t) = P\_n(t) + C\_(bI)\hat{}n(t)(Id - \Omega\_(n/bI)\hat{}bI)(C\_bS)\hat{}bI r\_bS(t-dt) + a\_bI).$$ Refer Paragraph [00203].

Where $\Omega\_(n/I)\hat{}bI$ is the angular velocity skew-symmetric matrix between the IMU frame and the navigation frame, coordinated in the IMU frame. [Refer Paragraph 00204].

The next step is to determine the IMU/INS latency by the following rule: dt should be adjusted such that all soundings from a supposed smooth and regular seafloor should belong to the same quadratic surface. The plane or quadratic equation model that will be used is defined as follows:

$$Z = s(X, Y, R)$$

where s is surface cartesian equation depending on 3 (for a plane) or 6 (for a quadratic surface) parameters (denoted by R), and X, Y, Z are the coordinates of georeferenced soundings.

Points selected for calibration should have the two following characteristics:

High angular rate to select data that are the most sensitive to latency;
Small angular acceleration to comply with the assumptions of the first order Taylor expansion of $C\_(bI)\hat{}n(t-dt)$ [Refer Paragraph 00205]; and
To lie on a supposed smooth and regular seafloor.

To satisfy these three conditions, a data selection module was implemented. This module checks these assumptions and feeds an adjustment module with appropriate sounding and raw data from the MBES systems.

The estimation problem will therefore determine both the surface parameters and the latency dt of interest.

Any selected sounding should verify the above equation and the geo-referencing equation. In other words, if $$X\_n = (\blacksquare(x\_n @ y\_n @ z\_n)) = P\_n(t) + C\_(bI)\hat{}n(t)(Id - \Omega\_(n/bI)\hat{}bI)(C\_(bS)\hat{}bI r\_bS(t-dt) + a\_bI)$$ Refer Paragraph [00206]:

then we should have the following observation equation.

$$Z_n = f(x_n, y_n, R)$$

One can readily see that this last equation can be re-written as a function of the unknown parameters $$g(R, dt) = 0$$

and that we have one equation per point. We can therefore solve this by applying a least square method to the linearized problem, following an iterative least square procedure.

In the present approach, the least square weight matrix requires the knowledge of the Combined Standard Measurement Uncertainty of each sounding. As the weight matrix is determined according to the model, it can be used to have an estimate of the precision of the estimated parameters. This procedure is conducted following Least Squares statistical tools.

Data selection is a requirement to feed LILAC with data satisfying the assumptions. Selected points correspond to high angular rate and low angular acceleration. This computation is done by using the direct output of IMU angular rates. To be more explicit, the norms of angular rate and angular acceleration associated to roll and pitch are computed. Then data corresponding simultaneously to high norm of angular rate and low norm of angular acceleration are selected for adjustment.

LIBAC (LiDAR IMU Boresight Automatic Calibration)

Line Pattern for LIBAC

Figure 5A:
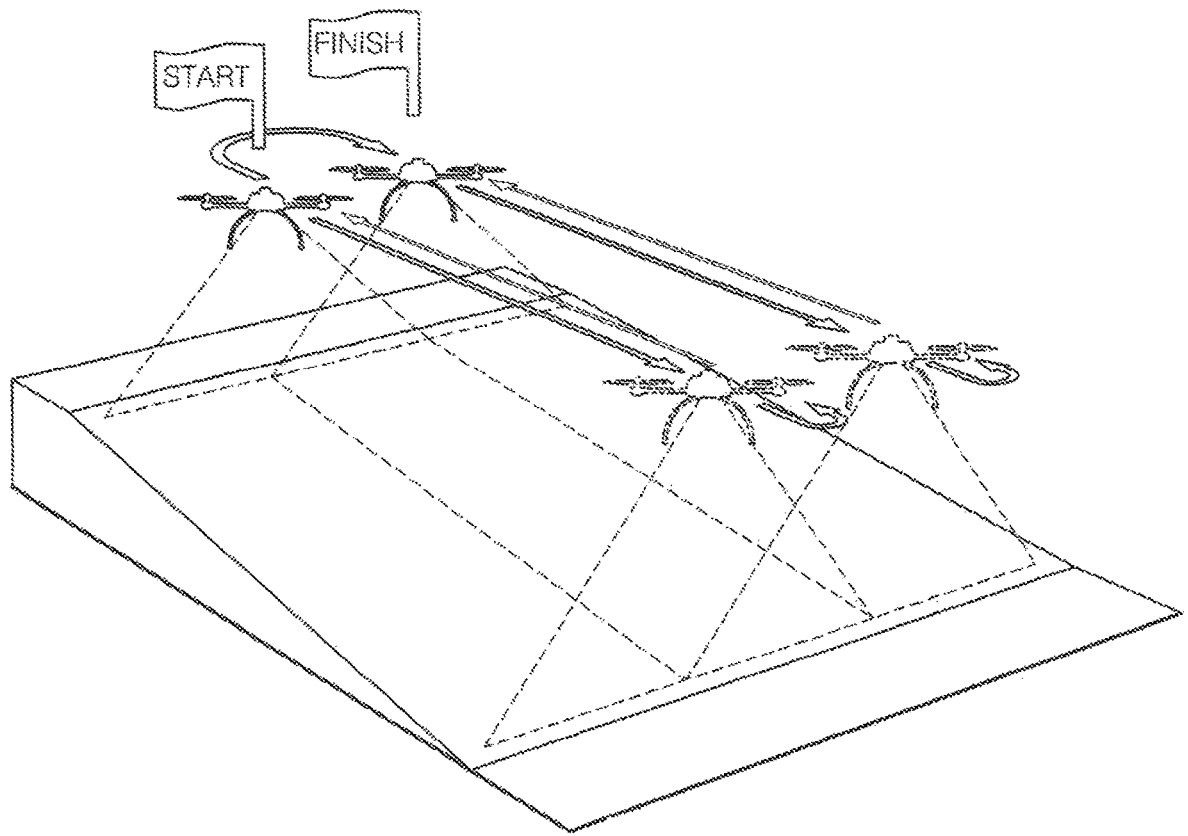
FIGS. 5A and 5B, represent the line pattern of fully automated LiDAR-IMU Boresight Automatic Calibration (LIBAC) system, formed by two overlapping and opposite survey lines, wherein the outer beam of the second line should overlap the points scanned at the Nadir of the first line.
Figure 5B:
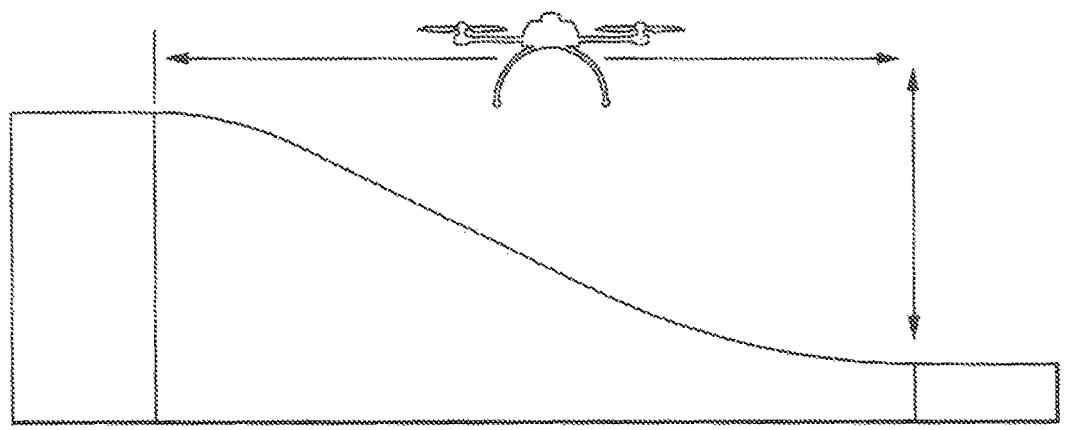

LIBAC needs four calibration strips lines over a smooth slope, as shown in FIGS. 5A and 5B. The line pattern of LiBAC formed by two overlapping and opposite survey lines, wherein the outer beam of the second line should overlap the points scanned at the Nadir of the first line. The length of each survey line is typically 40-50 meters. The height is 10-20 meters. The slope is at least 10%. The end points of the slope should not be exceeded.

Principle of LIBAC

The first phase of the method consists in geo-referencing the point cloud from the calibration strips and to compute for each point a Combined Standard Measurement Uncertainty value taking into accounts errors from latency, LiDAR grazing angle, IMU, positioning, boresight, lever-arms. Each point from the point cloud is thus supplemented with its a priori uncertainty.

The second phase consists in automatically finding planar surface elements from each calibration strip. This is done by a quad-tree algorithm that defines recursively a grid on which the LiDAR points can be modeled by a planar surface. For each cell of the quad-tree, if there is enough density of point originating for at least 2 different strips, if the point cloud is isotropic, and if those points can be modelled by a planar surface thanks to a Deming Least Square algorithm, then the cell is tagged as eligible for calibration.

The third phase consists in computing a boresight sensitivity criterion, which measures the variation of the cell's centroid elevation with respect to boresight. This sensitivity criterion is used to select the number of cells on which the boresight adjustment could be performed.

The last phase adjusts all points from each selected cell to belong to the same parametric (planar or quadratic) surface elements by optimizing boresight angles. The model used to perform this adjustment is not a priori linearized with respect to boresight angles. In other words, we do not consider the boresight transformation matrix to be a micro-rotation represented by a skew-symmetric matrix. We keep the non-linear representation of boresight and we make the adjustment by an iterative least square adjustment using this non-linear model.

Data Selection for Boresight Adjustment

The purpose of data selection is twofold:

First, to extract planar areas from the calibration strips. Indeed, we shall see in the next section that the observation equation we use for boresight adjustment express the fact that any point $X_n$ (as defined by equation (1)) from an overlapping survey line and belonging to a planar surface element, should verify $s(X_n)=0$ where $s(x, y, z)=z-ax-by-c$ is a plane equation, or a quadratic equation $s(x, y, z)=z-ax^2-by^2-cxy-dx-ey-f$.

Secondly, to select the planar surface elements having the highest sensitivity to boresight errors. Indeed, the adjustment should be performed from data exhibiting the highest boresight error, in order to maximize the input data systematic error to noise ratio.

Detection of Planar Surface Elements

The present approach follows [Hebel et al. 2012] and [Skaloud 2007], but in addition, we propagate the point uncertainty to the parametric surface parameters uncertainty, and we test the normalized residual to verify the correct geometric modelling of each surface element.

It consists in finding planar or quadratic surface elements from the terrain, for which we can observe the maximum effect of systematic error due to boresight. As we are constrained to find planar areas in natural surfaces we adopted a variable resolution approach based on a quad-tree decomposition. To decide if a quad-tree surface element is a plane, we use a Deming Least-Square (DLS) plane fitting method [Deming, 1943], [Moniot, 2009]. We use this method as it enables to take into accounts the propagated uncertainty of the LiDAR system on all points. Indeed, LiDAR returns are subjected to a certain level of uncertainty that should be considered by the plane fitting method. While we compute soundings thanks to the point geo-referencing model (1), we also compute a Combined Standard Measurement Uncertainty (CSMU) estimator. Using the CSMU of each point in input of the DLS method gives more reliable plan coefficient estimates than using a classical Total Least Square or a Principal Component Analysis estimator without weighted uncertainties.

The quad-tree subdivision process termination test takes into accounts the number of points within the surface elements and tests the presence of different survey lines (at least two survey strips are required).

When the subdivision of overlapping strips in planar areas is done, we look for the best surface elements to be used for boresight angles estimation. To do so, we construct a sensitivity criterion which computes the relevance of each surface element to boresight estimation. Points from the selected surface elements will be used for boresight adjustment. We remove surface elements produced by irregular point clouds (like trees, canopy) by letting the user to check the presence of irregularities and associated doubtful surface elements.

Boresight Sensitivity Criterion for Surface Elements

One of the key elements of the calibration procedure is the computation of boresight sensitivity indexes for each planar element, as detected by the quad-tree analysis.

This section describes the selection process of the most relevant surface elements for boresight estimation. This phase is essential to minimize the size of the underlying boresight adjustment (It shall become apparent that the size of the boresight estimation problem is 3 P+3, where P is the number of selected surface elements). In addition to this, we should guarantee that over the selected surface elements, the errors between overlapping data due to boresight angles are maximum.

On each surface element selected by the quad-tree process, the point cloud includes data from several overlapping strips. Let us consider a given planar surface element. We define C), the elevation difference between the centroid of the plane fitted with points from all survey strips and the centroid of the plane fitted with points from a strip j, namely;

$$C_j = Z_j - aX - bY - c \quad (2)$$

where $$Z_j = a_j X + b_j Y + c_j \quad (3)$$

is the elevation computed with the plane coefficients $a_j$, $b_j$, $c_j$ adjusted with point data from strip j, and X, Y are the coordinates of the center of the surface element.

To define the sensitivity criterion, we need to express $C_j$ as a function of boresight angles. To do so, we introduce the virtual vector from the averaged position of OC positions P_n^j [Refer Paragraph 00207] for strip j (which corresponds to LiDAR point within the given surface element) and the centroid of the surface element X_n^j. Refer Paragraph [00208]. Note that this last point depends on j as its elevation is computed using the coefficients of the plane fitted using strip j point data, as given by equation (3).

Therefore, $X\_n\hat{}j=(X, Y, Z)$ and we can also write this point using an approximation of the geo-referencing equation $$X\_n\hat{}j = P\_n\hat{}j + \{C^-\_bI\hat{}n\}\_j(C\_(bS)\hat{} \\ bI\{r\_rS\}\hat{}j(t-dt)) \text{ Refer Paragraph [00209]}. \quad (4)$$

where $\{C^-\_bI\hat{}n\}\_j$ is the average coordinate transformation matrix defined by the LiDAR system attitudes while the surface element is scanned by the LiDAR. [Refer Paragraph 00210]. To express the virtual LiDAR return we approximate it without boresight, as follows:

$$\{r\_bS\}\hat{}j = \{C^-\_bI\}\hat{}\_j(X\_n\hat{}j - P\_n\hat{}j) \text{ [Refer Paragraph 00211]}. \quad (5)$$

Then, using equation (4) and (5), we can construct the difference of elevation in (2) as the function of boresight. The sensitivity criterion we use is the min-max error of the gradient of $C_j$ with respect to the boresight angles (i.e.); the variation of $C_j$ due to boresight angles), over all survey strips j. Indeed, a surface element is sensitive to boresight whenever the planar surfaces fitted from points of strip j have a significant elevation difference due to boresight variations.

The global sensitivity criterion is an average of the roll, pitch and yaw sensitivity criteria. The method can be used for calibrating one angle: in this case the sensitivity criterion is limited to the one relative to this angle.

Adjustment of Boresight Angles

In this section, we explain how the data selected by planar surface elements are used for the estimation of the boresight angles. The principle of the method is to adjust the boresight angles in such a way that all the points belonging to selected surface elements satisfy the same plane or quadratic surface equation. Let $X_n = (x_n, y_n, z_n)^T$ be a point from a planar or quadratic surface element (p), satisfying the following cartesian equation:

$$Z_n = s(X_n, Y_p, Q) \quad (6)$$

Where Q is the set of parameter defining the parametric surface (plane of quadratic surface).

We shall denote by P the set of planar or quadratic surface elements selected for calibration by the data selection method. For a given point, all elements of equation (1), except the boresight angles $\delta\varphi$, $\delta\theta$, $\delta\psi$ and the lever arms $a_{bI}$ are given by the LiDAR survey system sensors (positioning, IMU, LiDAR). In the following, we will suppose that we already know the lever arms.

We write equation (1) as a function of the unknown variables $\delta\varphi$, $\delta\theta$, $\delta\gamma$ and $(Q_p)_{p \in P}$, the rest of the parameters $P_n$, $C\_bI\hat{}n$, $r_{bS}$ being measured or computed from the knowledge of LiDAR survey raw data, or assumed to be already known, like the lever arm $a_{bI}$. Refer Paragraph [00202].

From this, one can readily show that the left-hand side of equation (6) is a non-linear function denoted by $f$:

$$Z_n - s(X_n, Y_p, Q_p) = f(\delta\varphi, \delta\theta, \delta\psi, Q_p)$$

and which depend on the following variables:
3 boresight angles,
and planar surface element coefficients (3 for a plane, 6 for a quadratic surface).

The problem of boresight calibration is to find the boresight angles $\delta\varphi$, $\delta\theta$, $\delta\psi$ and the plane equation parameters $(Q_p)_{p \in P}$ such that for all $p \in P$:

$$f(\delta\varphi, \delta\theta, \delta\psi, Q_p) = 0 \quad (7)$$

A significant difference between our method and the methods presented in [Hebel et al. 2012] and [Skaloud 2007] lies in the fact that we do not consider that the boresight matrix is a linear operator (a skew symmetric matrix representing a micro-rotation). Indeed, we do not linearize the boresight direction transformation matrix as $C\_bS\hat{}bI = I+\Omega$, where $\Omega$ is the skew-symmetric approximation of the micro. Refer Paragraph [00199]. Notice that this approximation is done in existing LiDAR calibration methods and may lead to significant boresight calibration errors.

The data selection process is a very important component of the boresight calibration process. Its goal is indeed to select a relatively small number of planar surface elements for which the sensitivity to boresight errors is maximum.

The boresight adjustment problem is a collection of equations of the type of equation (7), that can be solved by applying an iterative weighted least square approach. From the statistical analysis of the least square solution, we can get the boresight precision as the variance of the adjusted parameter of the least square problem.

Conclusion

The automatic calibration method described in this application provides an integrated framework for performing a reliable and objective estimation of IMU-LiDAR latency and boresight angles. This method, based on the estimation of calibration parameters through the resolution of observation equations is able to deliver boresight and latency estimates as well as their precision.

Figure 1:
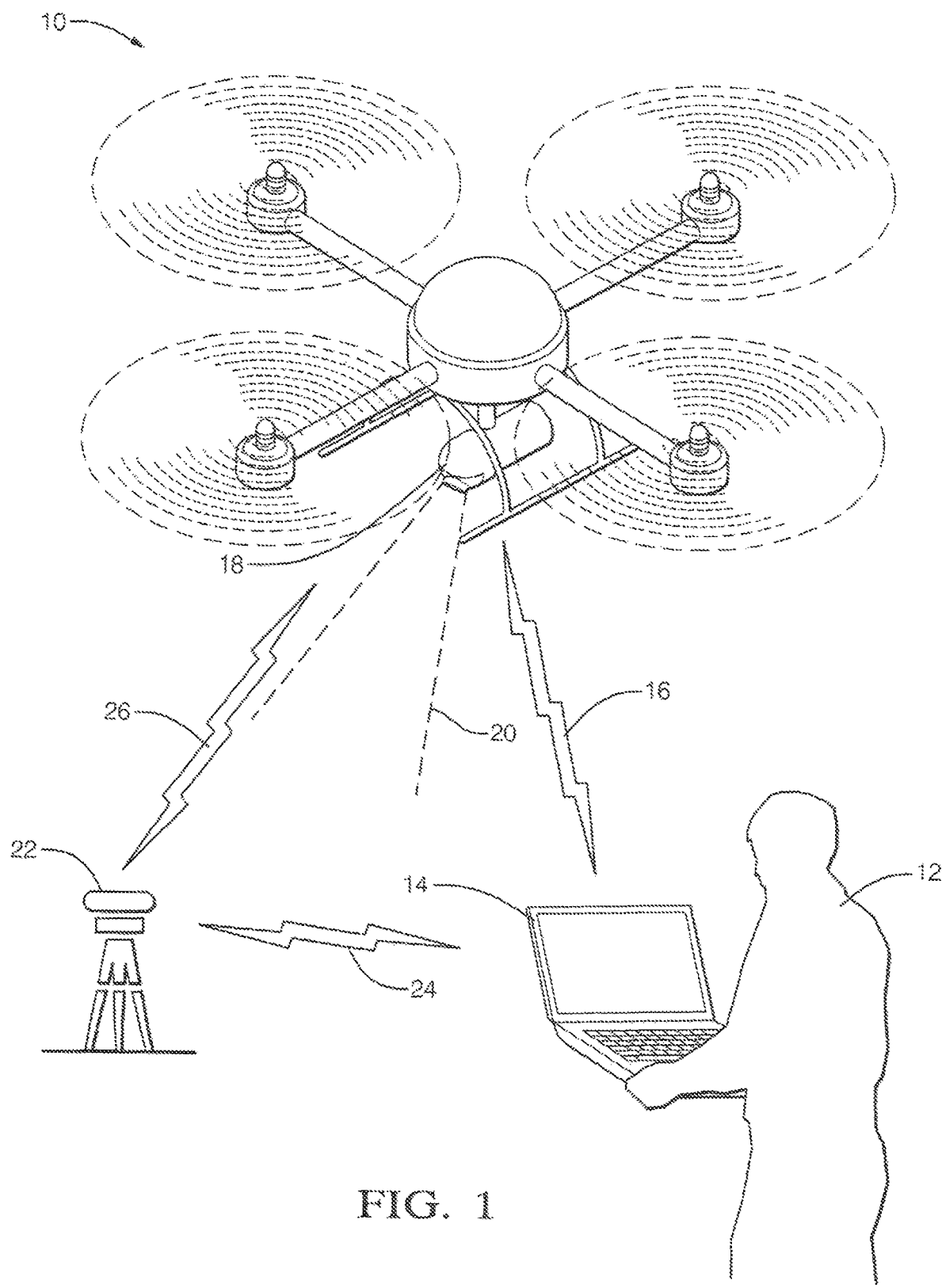
FIG. 1, is a perspective view of a quadrotor type UAV aircraft programmed and operated remotely by a ground based operator for LiDAR scanning of natural earth surfaces.

Referring to the drawing figures, and particularly to FIG. 1, a preferred embodiment of a LiDAR boresight automatic calibration apparatus and method in accordance with the present invention is illustrated. A quadrotor type UAV 10 can be operated remotely by a ground based operator 12 manipulating a base station 14 for programming and operating the UAV 10 as well as uploading and downloading data. The base station 14 is interconnected with the UAV 10 by a multi-channel radio frequency (RF) link 16. Mission planning information including flight control and operating instructions for the UAV 10 are either stored in controller memory of the base station 14 or a controller (not illustrated) within the drone aircraft 10. The UAV 10 carries an easily reconfigurable mounted instrument or operating package such as a LiDAR pod 18 which is cable connected and powered by the UAV 10.

Varied configurations of UAVs 10 such as depicted herein can be employed in modified form to practice the present invention.

The communications network can also include continuous access to a Global Navigation Satellite system (GNSS) (not illustrated) either directly to the UAV 10 or relayed through one or more local GNSS base stations 22 for recording data during flight. The base stations 22 are also interconnected directly with the UAV 10 and the base station 14 by additional multi-channel radio frequency (RF) links 24 and 26, respectively.

The LiDAR system has an emitter which produces a sequence of outgoing pulses 20 of coherent collimated light that is transmitted in a given direction towards a predetermined ground based natural or man-made surfaces.

Figure 2:
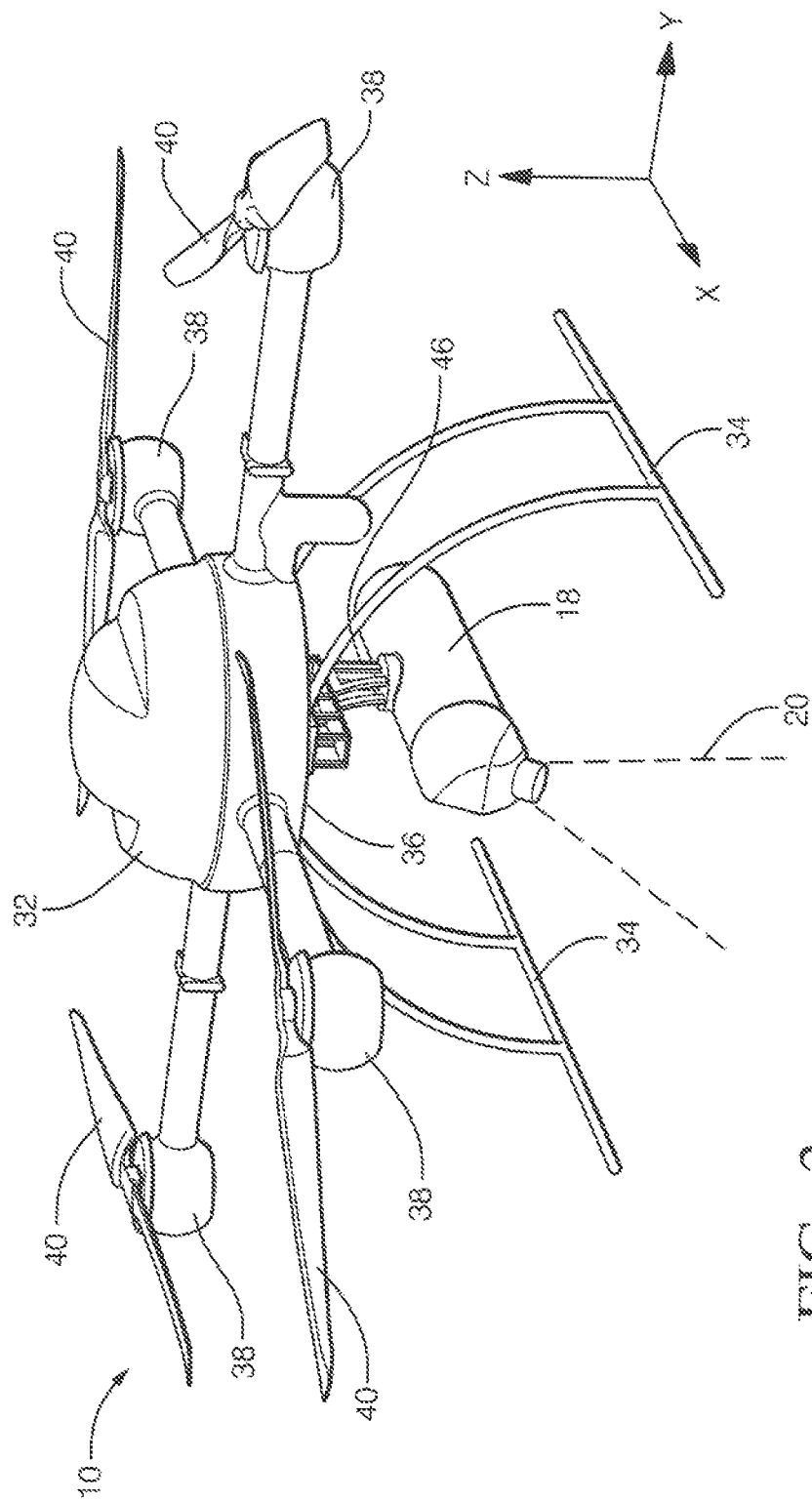
FIG. 2, is a perspective view of the quadrotor type UAV aircraft of FIG. 1 carrying a lightweight LiDAR pod system illustrated on an enlarged scale.

As best seen in FIG. 2, the quadrotor type UAV 10 consists of a center pod 32 containing a battery, motor and control electronics. Resilient landing struts 34, as well as the LiDAR operating package 18 extend below the lower surface 36 of the center pod 32. The gimbal or fixed mount 46 is illustrated in an extremely simplified, schematic form, it being understood that it enables at least three degrees of rotational freedom (i.e., yaw, pitch and roll) of the operating package 30 with respect to the center pod 32 of the drone aircraft 10. Furthermore, it can enable independent bidirectional translation along three (e.g., X, Y and Z) axes of the operating package 18 with respect to the center pod 32 of the UAV 10. Four circumferentially arranged arms with motor pods 38 extend outwardly from the center pod 32, each supporting a rotor 40.

Referring to FIG. 3, a typical LiDAR system 28 includes a Lidar 18, an INS (or IMU) and a GPS receiver 42. The LiDAR frame is (bS) and the IMU frame is (bI) based. The lever arm between the LiDAR and positioning Reference Point (RP) is $a_{bI}$. The LiDAR ranging returns, coordinated in the (bS) frame, are denoted by $r_{bS}$.

Figure 4:
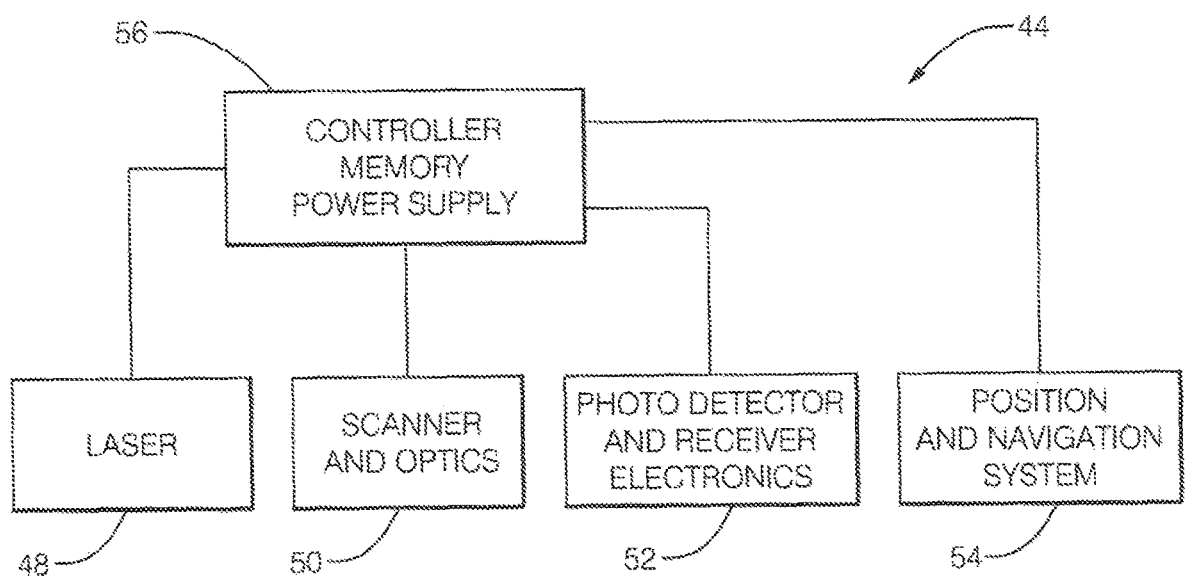
FIG. 4, is a block schematic diagram of the basic systems of the UAV aircraft with LiDAR of FIG. 2.

Referring to FIG. 4, a block schematic diagram of the basic systems of the UAV aircraft with LiDAR of FIG. 2 include a laser 48, a scanner and associated optics 50, a photodetector and receiver electronics 52, and a position and navigation system 54 are each interfaced with a controller 56, including active and passive memory and a power supply.

Referring to FIGS. 5A and 5B, boresight calibration is defined as capturing the angles between a LiDAR and the IMU body frames of reference. The goal of the calibration is to correct the misalignment between the two sensors. The applicant has developed a boresight calibration tool that can be used in the natural environment to facilitate flight operations.

Flight planning and area specifications include: defining alignment waypoints, employing four (4) scan lines, providing a slope of 20-30% with a length of 40 to 50 m in length with no vegetation on the ground.

The required flight path requires the following steps;
LiDAR 18 before take-off.
2. Initiation.
3. Scan one scan line above the slope in one direction.
4. Turn around 180°.
5. Scan one line of 40 m above the slope in an opposite direction of the first line.
6. Fly 50 m perpendicular from the line (to obtain 50% overlap with the first two scan lines.
7. Scan one line of 40 m above the slope in one direction.
8. Turn around 180°.
9. Scan one line above the slope in opposite direction of the first scan line.
10. Perform waypoint alignment.
11. Follow the usual workflow when you land with md4-1000 and mdLiDAR payload.

FIGS. 6A, 6B and 6C represent the line pattern of a fully automated LiDAR-IMU Latency Automatic Calibration (LI-LAC) system, formed by one survey line over relatively flat and smooth terrain, wherein the UAV should perform this line with maximum allowable roll oscillations, generating high roll velocities.

Figure 7:
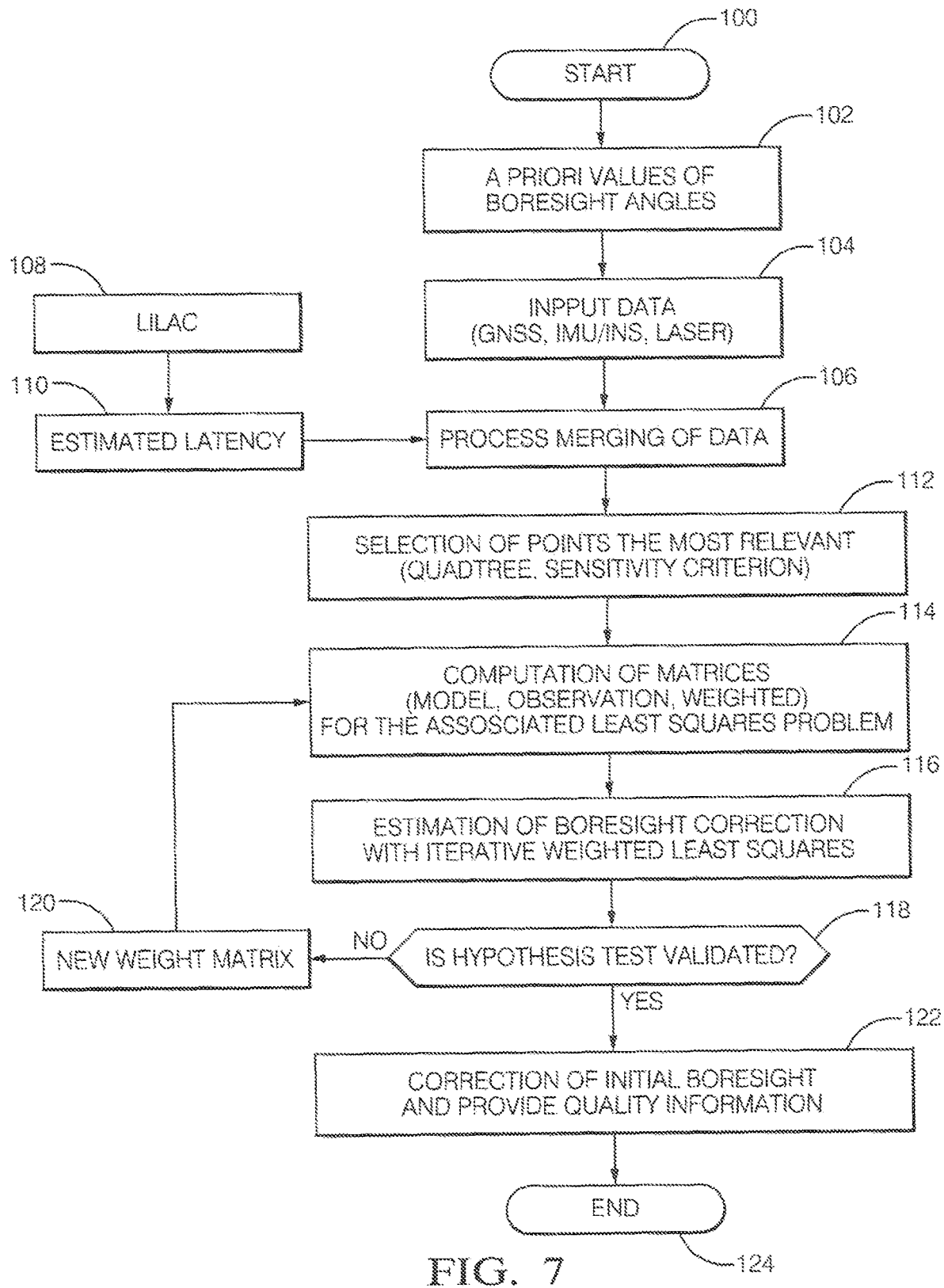
FIG. 7 represents a logic flow chart of the LiDAR IMU Boresight Automatic Calibration, or LIBAC, depicting the first phase of the method consisting in geo-referencing the point cloud from the calibration strips and to compute for each point a Combined Standard Measurement Uncertainty value taking into account errors from latency, LiDAR grazing angle, IMU, positioning, boresight, lever-arms, wherein each point from the point cloud is thus supplemented with its a priori uncertainty.

FIG. 7 is a flowchart of an exemplary process of a logic flow of the LiDAR IMU Latency Automatic Calibration, or LILAC, depicting a first calibration method devoted to IMU-LiDAR latency determination from neutral terrain data. The depicted flowchart is initiated at a start step 100 feeding a priori values of boresight angles logic block 102, which, in turn feeds an input data (GNSS, IMU/INS, LiDAR) logic block 104. The input data block 104 feeds a process merging of data block 106. A LILAC processor 108 feeds an estimated; latency logic block 110, which, also feeds the process merging of logic block 106, with the combined resultant feeding a selection of the most relevant points (QUADTREE, SENSITIVITY CRITERION) to a logic block 112. Logic block 112 feeds logic block 114 which effects computation of matrices (MODEL, OBSERVATION, WEIGHTED) for the associated least squares problem. Logic block 114 feeds a logic block 116 which provides estimation of boresight correction with iterative weighted least squares. Logic block 118 which tests whether the hypothesis test is validated. If not, Logic block 118 feeds a new weight matrix in logic block 120, which, in turn, feeds back to logic block 114, and the process steps are repeated. If the hypothesis test is validated in logic block 118. The results are fed to logic block 122 for the correction of initial boresight and to provide quality information. Thereafter logic block 122 is fed to end step 124, and the algorithm is completed.

Figure 8:
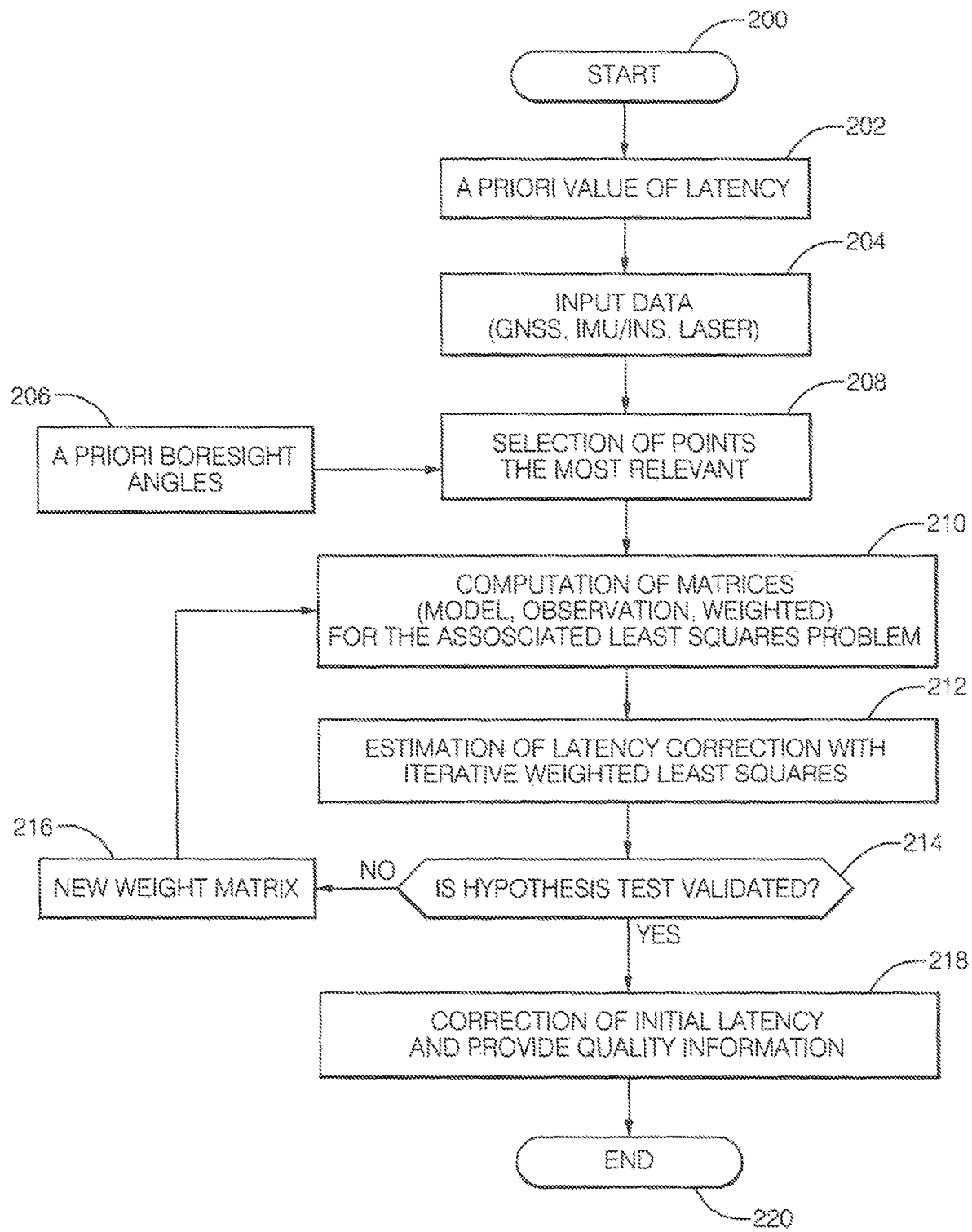
FIG. 8 represents a logic flow chart of the LiDAR IMU Latency Automatic Calibration, or LILAC, depicting a first calibration method devoted to IMU-LiDAR latency determination from neutral terrain data.

FIG. 8 is a flowchart of an exemplary process of a logic flow of the LiDAR IMU Boresight Automatic Calibration, or LIBAC, depicting the first phase of the method consisting in geo-referencing the point cloud from the calibration strips and to compute for each point a Combined Standard Measurement Uncertainty value taking into account errors from latency, LiDAR grazing angle, IMU, positioning, boresight, lever-arms, wherein each point from the point cloud is thus supplemented with its a priori uncertainty. The depicted flowchart is initiated at a start step 200 feeding a priori values of latency logic block 202, which, in turn feeds an input data (GNSS, IMU/INS, LASER) logic block 204. The input data block 204 feeds a data block 208 for selection of the most relevant points. An a priori boresight angles data block 206 also feeds the logic block 208. Logic block 208 feeds logic block 210 providing Computation of Matrices (MODEL, OBSERVATION, WEIGHTED) for the associated Least Squares Program. Logic Block 210 feeds a logic block 212 which provides an Estimation of Latency Correction with Iterative Weighted Least Squares. Logic Block 212 feeds a Logic Block 214 which determines if the Hypothesis Test is Validated. If "No", Logic Block 214 feeds a Logic Block 216 which establishes a New Weight Matrix and feeds it to logic block 210. If "Yes", logic block 214 feeds a logic block 218 which provided for Correction of Initial Latency and Provides Quality Information. Thereafter logic block 218 is fed to end step 220, and the algorithm is completed.

The following documents are deemed to provide a fuller background disclosure of the inventions described herein and the manner of making and using same. Accordingly, each the below-listed documents are hereby incorporated into the specification hereof by reference.

[Rabine Keyetieu, Nicolas Seube and Stéfanie Van-Wierts], unpublished, "Boresight and Latency Automatic Calibration of LiDAR Systems on Natural Surfaces".

[Rabine Keyetieu, Nicolas Seube and Stéfanie Van-Wierts], unpublished, "Boresight Automatic Calibration of LiDAR Systems on Natural Surfaces".

U.S. Patent Application No. 2016/0291134 A1 to Droz et al. entitled "Long Range Steerable LiDAR System".

U.S. Pat. No. 9,285,477 B1 to Smith et al. entitled "3D Depth Point Cloud from Timing Flight of 2D Scanned Light Beam Pulses".

U.S. Pat. No. 8,543,265 B2 to Ekhaguere et al. entitled "Systems and Methods for Unmanned Aerial Vehicle Navigation".

U.S. Pat. No. 7,969,558 to Hall entitled "High Definition LiDAR System".

[Barber et al., 2008] Barber, D., Mills, J., Smith-Voysey, S., 2008. Geometric validation of ground-based mobile laser scanning system. ISPRS Journal of Photogrammetry and Remote Sensing 63~(1), 128-141.

[Burman, 2000] Burman, H., 2000. Calibration and orientation of airborne image and laser scanner data using OPS and INS PhD Dissertation, Royal Institute of Technology Department of Geodesy and Photogrammetry, Stockholm, Sweden, April 2000.

[Deming, 1943] Deming, W. E., Mills, Statistical Adjustment of Data. Wiley, New-York, 1943.

[Filin, 2003] Filin, S., 2003. Recovery of systematic biases in laser altimetry data using natural surfaces. Photogrammetric Engineering and Remote Sensing 69, 1235-1242.

[Filin et al., 2004] Filin, S., Vosselman, G., 2004. Adjustment of airborne laser altimetry strips. In: ISPRS Congress Istanbul, Proceedings of Commission Ill.

[Friess 2006] Friess, P., 2006. Toward a Rigorous Methodology for Airborne Laser Mapping. Proceedings of the International Calibration and Validation Workshop EURO COW, Castelldefels, Spain.

[Habib et al., 2010] Habib, A., Bang, K., Kersting, A., Chow, J., 2010. Alternative methodologies for lidar system calibration. Remote Sensing 2~(3), 874-907.

[Hebel et al. 2012] Hebel, M. and Uwe, S., Simultaneous Calibration of ALS Systems and Alignment of Multiview LiDAR Scans of Urban Areas, IEEE Transactions on Geoscience and Remote Sensing, Vol. 50, No. 6, June 2012, pp. 2364-2379.

[Kumari et al., 2011] Kumari, P., Carter, W. E., Shrestha, R. L., 2011. Adjustment of systematic errors in als data through surface matching. Advances in Space Research 47, 1851-1864.

[Moniot (2009)] Moniot, R. K., Deming least-squares fits to multiple hyperplanes. In Applied Numerical Mathematics, 59(2009), pp: 135-150.

[Morin et al., 2002] Morin, K., Naser El-Sheimy, 2002. Post-mission adjustment methods of airborne laser scanning data. In: FIG. XXII Int. Congress, Washington D.C., Apr. 19-26, 2002.

[Schenk, 2001] Schenk, T., 2001. Modeling and analyzing systematic errors of airborne laser scanners. Tech. rep., Department of Civil and Environmental Engineering and Geodetic Science. The Ohio State University, Columbus, Ohio

[Seube et al., 2012] Seube, N, Picard, A. and Rondeau, M., 2012. A simple method to recover the latency time of tactical grade IMU systems, ISPRS Journal of Photogrammetry and Remote Sensing 74 (2012) 85-89.

[Skaloud 2006] Skaloud, J., 2006. Reliability of direct geo-referencing: Phase 0. Tech. rep., Euro SDR commission 1: sensors, primary data, acquisition and geo-referencing.

[Skaloud and Litchi, 2006] Skaloud, J., Litchi, D., 2006. Rigorous approach to boresight self-calibration in airborne laser scanning. ISPRS Journal of Photogrammetry & remote Sensing 61, 47-59.

[Skaloud 2007] Skaloud, J., Shaer, P., 2006. Towards automated LiDAR boresight self-calibration. Proc. 5th Int. Symp. Mobile Mapping Technol., May 29-31, 2007.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. For example, various types of UAV can be employed. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

Notes Re. Equation Equivalents $[C]\_(bS)\^bI = C_{bS}^{bI}$ $[C]\_(F1)\^F2 = C_{F1}^{F2}$ $Xn(t) = Pn(t) + C\_(bI)\^n(t-dt)(C\_(bS)\^bI\text{r\_bS}(t) + \text{a\_bI}) =$ $$X_n(t) = P_n(t) + C_{bI}^n(t-dt)\left(C_{bS}^{bI}r_{bs}(t) + a_{bI}\right)$$

$C\_(bI)\^n = C_{bI}^n$ $X\_n(t) = P\_n(t) + C\_(bI)\^n(t)\left(Id - \Omega\_(n/bI)\^bI\right)(C\_(bS)\^bI\text{r\_bS}$ $(t-dt) + \text{a\_bI}) = X_n(t) = P_n(t) + C_{bI}^n(t)\left(Id - dt\Omega_{n/bI}^{bI}\right)\left(C_{bS}^{bI}r_{bs}(t) + a_{bI}\right)$ $\Omega\_(n/bI)\^bI = \Omega_{n/bI}^{bI}$ $C\_(bI)\^n(t-dt) = C_{bI}^n(t-dt)$ $X\_n = (\blacksquare(x\_n@y\_n@z\_n)) =$ $P\_n(t) + C\_(bI)\^n(t)\left(Id - \Omega\_(n/bI)\^bI\right)(C\_(bS)\^bI\text{r\_bS}(t-dt) + \text{a\_bI}) =$ $$X_n = \begin{pmatrix} x_n \\ y_n \\ z_n \end{pmatrix} = P_n(t) + C_{bI}^n(t)\left(Id - dt\Omega_{n/bI}^{bI}\right)\left(C_{bS}^{bI}r_{bS}(t) + a_{bI}\right)$$

$P\_n\^j = P_n^j$ $X\_n\^j = X_n^j$ $X\_n\^j = P\_n\^j + [C^-\_bI\^n]\_j(C\_(bS)\^bI[\text{r\_bS}]\^j(t-dt)) =$ $$X_n^j = P_n^j + \overline{C}_{bI_j}^n\left(C_{bS}^{bI}r_{bS}^j(t-dt)\right)$$

$[C^-\_bI\^n]\_j = \overline{C}_{bI_j}^n$ $[\text{r\_bS}]\^j = [C^-\_bI\^n]\_j(X\_n\^j - P\_n\^j) = r_{bS}^j = \overline{C}_{bI_j}^n\left(X_n^j - P_n^j\right)$

The invention claimed is:

1. A method of automatically calibrating a mobile LiDAR system comprising the steps of:

providing a remotely controlled UAV equipped with a global network satellite (GNSS) system, an inertial measurement unit (IMU), and a light detection and ranging (LiDAR) device;

calibrating LiDAR-IMU roll, pitch and yaw boresight angles and lever arms between the positioning reference point (PRP) and the optical center (OC) of the LiDAR to eliminate systematic errors resulting from misalignment between the LiDAR and IMU measurement frames;

activating the LiDAR to acquire natural terrain data via scanning natural terrain through overlapping predetermined strips;

subdividing, based on the natural terrain data, the strips into small surface elements whenever they can be fitted into a common planar surface;

employing an automatic planar surface element selection process most relevant for boresight estimation, adjusting the selection points to planar surface elements to optimizing boresight angles, and storing resultant data in a system memory device.

2. The method of automatically calibrating a mobile LiDAR system of claim 1, further comprising the step of applying a boresight sensitivity criteria to select a surface element most relevant for boresight estimation.

3. The method of automatically calibrating a mobile LiDAR system of claim 1, wherein the step of scanning preselected points from natural terrain or man-made structures though overlapping strips comprises serially traversing at least two overlapping and opposite parallel survey lines wherein the outer beam of the second line overlaps points scanned at the nadir of the first line.

4. The method of automatically calibrating the mobile LiDAR system of claim 1, further comprising the step of repositioning said remotely controlled aerial UAV aircraft to alternate selected points of natural terrain and repeating said steps.

\* \* \* \* \*

UNITED STATES PATENT AND TRADEMARK OFFICE
CERTIFICATE OF CORRECTION

PATENT NO. : 11,782,141 B2
APPLICATION NO. : 16/267470
DATED : October 10, 2023
INVENTOR(S) : Rabine Keyetieu et al.

It is certified that error appears in the above-identified patent and that said Letters Patent is hereby corrected as shown below:

In the Specification

At Column 1, Line number 34, please change LiDAR_LMU to LiDAR_IMU.

At Column 2, Line number 7, please change Hlebel to Hebel.

At Column 5, Line number 43, please change &p to $\delta\varphi$.

At Column 6, Line 31, please change OPS system to GPS system.

At Column 10, Line 46, please change C) to $C_j$.

At Column 11, Line 1, please change $X\_n^j = (X, Y, Z)$ to $X\_n^j = (X, Y, Z_j)$.

At Column 14, Line 67, please change OPS to GPS.

Signed and Sealed this
Nineteenth Day of March, 2024

Katherine Kelly Vidal
*Director of the United States Patent and Trademark Office*